July 28, 1953
W. F. SLATER
2,646,752
PUMP WITH INLET STRAINER
Filed Nov. 25, 1949
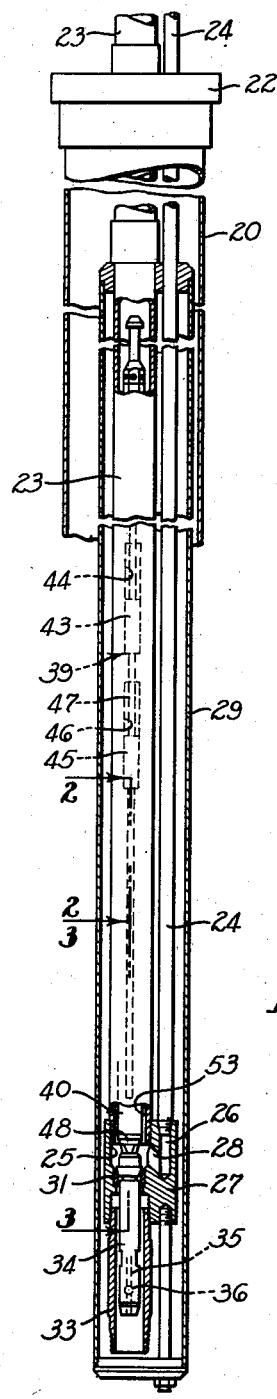
INVENTOR.
WILLARD F. SLATER
BY HIS ATTORNEYS.
HARRIS, KIECH, FOSTER & HARRIS Patented July 28, 1953

2,646,752

UNITED STATES PATENT OFFICE 2,646,752

PUMP WITH INLET STRAINER

Willard F. Slater, San Marino, Calif., assignor, by mesne assignments, to Dresser Equipment Company, Cleveland, Ohio, a corporation of Ohio Application November 25, 1949, Serial No. 129,230

12 Claims. (Cl. 103—46)

My invention relates to pumps for wells, and, more particularly, to a pump having an inlet strainer for intercepting foreign matter which would otherwise enter the pump with the well fluid, a primary object of the invention being to provide a device for removing such matter from the well.

In preparing an oil well for production, it is common practice to run various devices, such as swabs, packers, etc., into the well with the result that a considerable quantity of foreign matter is left in the well fluid at the bottom of the hole. The foreign matter may include particles of rubber abraded from the swabs or packers. When a pump is subsequently installed in the well, the particles of foreign matter tend to plug the inlet passages of the pump and may partially or completely close these passages. This is particularly true if the foreign matter includes particles of rubber since they swell to a considerable degree in the oil, particularly at the temperature prevailing in deep wells. Relatively small pieces of rubber may swell to an extent sufficient to seriously affect, or completely interrupt, the operation of the pump if they lodge in the inlet or outlet passages thereof. Also, such rubber particles may lodge in the inlet and outlet valves of the pump and interfere with the operation thereof. This is particularly true in the case of most types of fluid-operated pumps, since the passages are usually of small diameter and the valves of low lift.

Whenever the pump becomes fouled in the foregoing manner, it is, of course, necessary to pull it from the well and remove the foreign matter interfering with its operation. It may be necessary to do this several times before all of the foreign matter has been eliminated. Also, it has been found that when the pump is pulled from the well, the foreign matter is frequently washed free and remains in the well so that it may plug the pump a large number of times before it either dissolves or is removed from the well.

It has been proposed to provide an intake screen or strainer for intercepting the foreign matter before it enters the pump, but the strainer frequently becomes plugged with foreign matter to such an extent that it interferes with the operation of the pump and must be pulled from the well for cleaning. The foreign matter is frequently washed free from the strainer as it is pulled from the well so that, even if the pump is equipped with an inlet strainer, it is frequently necessary to pull the pump a large number of times before the foreign matter is eliminated.

As will be apparent, pulling the pump repeatedly to eliminate such foreign matter is expensive, particularly where a set pump is employed so that a sucker rod and/or one or more strings of tubing must be pulled to provide access to the pump, an important object of the invention being to provide a device which removes substantially all of the foreign matter from the well with no necessity for pulling the pump a large number of times.

More specifically, an object of the invention is to provide a pump which is provided with an inlet strainer or screen disposed in a chamber, and which is provided with a check valve for preventing flow from the chamber through its inlet. With this construction, any foreign matter intercepted by the strainer is retained in the chamber so that it cannot be washed back into the well during removal of the pump, which is an important feature. Consequently, all of the foreign matter may be removed by pulling the pump once, or at most a very few times.

The present invention is particularly effective when incorporated in a free pump which can be removed from the well hydraulically in a relatively short time and with little expense. Consequently, an object of the present invention is to provide a free pump having an inlet strainer and a check valve for retaining foreign matter intercepted by the strainer.

Another advantage of embodying the present invention in a free pump arises from the fact that the particles of rubber, or other foreign material, tend to float on the surface of the body of well fluid in the bottom of the hole because of the fact that they are of relatively low specific gravity and because of the fact that gas bubbles tend to adhere to the particles of rubber to float them to the surface. Since a free pump may be removed from and reinstalled in the well in a relatively short period of time, the fluid level in the well will not change appreciably so that if any particles of foreign matter remain, they will be drawn into and intercepted by the strainer promptly. This materially reduces the time required to remove all of the foreign matter from the well, which is an important feature. With set pumps, on the other hand, considerable periods of time are required for removing and installing the pump so that the level of well fluid in the hole may change considerably. Consequently, it may be necessary to operate the pump for a considerable interval of time to bring the fluid level down to the pump so that additional foreign matter will be drawn into the strainer. This may necessitate maintaining pulling equipment on hand for a considerable length of time, which is expensive.

The foregoing objects and advantages of the present invention, together with various other objects and advantages which will become apparent, may be attained through the employment of the exemplary embodiment which is illustrated in the accompanying drawing and which is described in detail hereinafter. Referring to the drawing:

Fig. 1 is a utility view illustrating the present invention as installed in a well;

Fig. 2 is an enlarged, vertical sectional view which illustrates the upper end of a strainer device of the invention and which is taken along the broken line 2—2 of Fig. 1;

Fig. 3 is a downward continuation of Fig. 2 and is taken along the broken line 3—3 of Fig. 1;

Fig. 4 is a fragmentary view duplicating the upper end of Fig. 3 on an enlarged scale; and, Fig. 5 is a transverse sectional view taken along the broken line 5—5 of Fig. 4.

Referring particularly to Fig. 1, the numeral 20 designates a casing which is set in an oil well with its lower end open to an oil producing formation so that oil and other fluids from the formation may enter the interior of the casing. Connected to the upper end of the casing 20 is a casing head 22. Suspended from the casing head 22 and extending downwardly into the casing 20 are power and production tubings 23 and 24, the tubings being arranged in parallel, i. e., side by side, in the particular construction illustrated. The power and production tubings 23 and 24 are threaded at their lower ends into bores 25 and 26, respectively, in a shoe 27, the latter being provided with a lateral passage 28 therein which connects the bores 25 and 26 to provide fluid communication between the power and production tubings. The lower ends of the power and production tubings and the shoe 27 are enclosed by a gas anchor barrel 29 which is bolted to the shoe.

As shown in Fig. 1 and as best shown in Fig. 3, an annular seat 31 is carried by an annular shoulder 32 in the bore 25 in the shoe 27. Seated on the annular seat 31 and extending downwardly into an inlet pipe 33 threaded into the lower end of the bore 25 is an inlet fitting 34 having an inlet passage 35 therethrough which communicates at its lower end with the well. The inlet fitting 34 carries an inlet check valve 36 which permits flow of well fluid upwardly through the inlet passage 35, but which prevents reversed flow back into the well.

The inlet fitting 34 is provided at its upper end with a tapered seat 38 for a pump 39 which incorporates a strainer device 40 of the invention. In the particular construction illustrated, the pump 39 is of the fluid-operated type, although it will be understood that the strainer device 40 of the invention may be utilized with other types of pumps, such as rod-operated types. Any suitable type of fluid-operated pump may be employed for the pump 39 so that it will not be described in detail. Briefly, the fluid-operated pump 39, as indicated in Fig. 1, includes a motor piston 43 which is reciprocable in a motor cylinder 44 and includes a pump piston 45 which is reciprocable in a pump cylinder 46 and which is connected to the motor piston by a piston rod 47. An operating fluid, usually oil, under relatively high pressure is delivered to the pump 39 to operate it through the power tubing 23 and the fluid discharged by the pump is conveyed to the surface through the production tubing 24. The pump also includes valve means for regulating the delivery of operating fluid thereto in such a manner as to apply to the motor piston 43 fluid pressure differentials tending to displace the motor piston first in one direction and then in the opposite direction so as to reciprocate the motor piston. All of this is well known in the art so that any further description thereof is unnecessary.

The fluid-operated pump 39 is preferably, but not necessarily, of the so-called "free" type in that it is movable hydraulically through the power tubing 23 between the surface of the ground and an operating position where the strainer device 40, which is connected to the lower end of the pump 39 in the particular construction illustrated, is seated on the seat 38. As is well known in the art, the pump 39 may be removed from the well hydraulically by introducing the operating fluid under pressure into the production tubing 24, rather than into the power tubing 23, by means of a suitable valve mechanism on the surface. The pressure of the operating fluid introduced into the production tubing in this manner acts on an annular area 48 at the lower end of the strainer device 40 to unseat the pump, the pressure of the operating fluid thereafter being applied to the entire cross-sectional area of the pump to move it and the strainer device upwardly through the power tubing 23 to the surface, as is well known in the art.

Referring particularly to Fig. 2, the pump 39 is provided at its lower end with a fitting 50 provided with an inlet 51 and an outlet 52 which communicate with the pump cylinder 46, the inlet and the outlet each comprising a plurality of passages only one of which is visible. The inlet 51 communicates with the well through the strainer device 40 and the inlet fitting 34 as will be discussed in more detail hereinafter, and the outlet 52 communicates with an annular space 53 which extends downwardly between the power tubing 23 and the strainer device 40 and which communicates at its lower end with the lateral passage 28 in the shoe 27 so that production fluid discharged by the pump may enter the production tubing 24. The annular space 53 is closed at its upper end by suitable packing (not shown) to separate the operating and production fluids. Flow through the inlet 51 and outlet 52 is controlled by an inlet and outlet valve assembly 54 which permits well fluid to enter the pump cylinder 46 during the upward stroke of the motor and pump pistons 43 and 45 and which permits the discharge of production fluid from the pump cylinder during the downward stroke of the motor and pump pistons. The valve assembly 54 may be of any suitable type and will not be described in detail.

The strainer device 40 of the invention, as shown in Figs. 2 and 3, includes a strainer barrel 60 which is threaded onto the lower end of the fitting 50 and which is closed at its lower end by an element 61 threaded thereinto, the element 61 being tapered for engagement with the tapered seat 38 provided by the inlet fitting 34. Also, threadedly connected to the lower end of the fitting 50 is a balance chamber 62 for the pump 39, the balance chamber extending downwardly into and being spaced inwardly from the strainer barrel 60. The function of the balance chamber 62 is well known in the art and will not be discussed hereinafter.

The strainer device 40 is provided with an inlet passage 63 which communicates at its upper end with the inlet 51 of the fluid-operated pump 39 and which communicates at its lower end with the upper end of the inlet passage 35 through the inlet fitting 34 so that well fluid may enter the inlet 51 of the pump. The inlet passage 63 includes the interior of the strainer barrel 60 and includes a bore 64 through the element 61 at the lower end of the strainer barrel.

Disposed in and spaced inwardly from the strainer barrel 60 is a cylindrical strainer or screen 65 which comprises a perforated tube in the particular construction illustrated. The cylindrical strainer 65 is provided at its upper end with an annular fitting 67 which is spaced outwardly from the balance chamber 62 to provide an annular space 68 therebetween through which fluid may flow upwardly to the inlet 51 of the pump. The fitting 67 carries an annular packing element 69 which engages the inner wall of the strainer barrel 60 to provide a fluid-tight seal between the upper end of the cylindrical strainer and the strainer barrel.

The lower end of the cylindrical strainer 65 is closed by a fitting 70 which is provided with a downwardly facing bore 71 therein for a stem 72 of a tapered check valve 73 which is adapted to engage a tapered seat 74 at the upper end of the bore 64 through the element 61. The cylindrical strainer 65 is floatingly held in its operating position in the strainer barrel 60 by a spring 75 which encircles the fitting 70 and is seated at one end against an annular shoulder 76 thereon, the spring being seated at its opposite end on the upper end of the element 61. The spring 75 maintains the cylindrical strainer 65 in such a position that the check valve 73 may move between an open position wherein it disengages the seat 74 and a closed position wherein the check valve engages the seat. As will be apparent, the check valve 73 opens to permit upward flow through the inlet passage 63, but closes to prevent downward flow therethrough. It will be apparent that, with the construction illustrated, the cylindrical strainer 65 may be removed readily from the strainer barrel 60 for cleaning by disconnecting the element 61 from the strainer barrel.

In operation, as soon as the well has been prepared for production and the tubings 23 and 24 have been set therein, the fluid-operated pump 39 with the strainer device 40 of the invention connected thereto may be run into the well hydraulically, or otherwise, in the usual manner. Operating fluid under pressure is then delivered to the pump 39 through the power tubing 23 to actuate it, whereupon it pumps well fluid into the production tubing 24 which conveys it to the surface as production fluid. The check valve 73 of the strainer device 40 opens automatically to permit well fluid to enter the pump 39.

Any foreign matter in the well fluid, such as particles of rubber which may be have been abraded from swabs employed in preparing the well for production, are intercepted by the strainer 65 and retained in the annular chamber between the strainer and the strainer barrel 60 so that they cannot enter and plug the passages of the pump. In the event that sufficient foreign matter is intercepted by the strainer 65 to interfere with the operation of the pump, the pump and the strainer device 40 may be removed from the well readily by reversing the flow of fluid through the system, i. e., by directing the flow of operating fluid downwardly through the production tubing 24, rather than the power tubing 23. An important feature of this invention is that the foreign matter intercepted by the strainer 65 cannot drop or be washed back into the well during the operation of removing the pump and the strainer device from the well because of the fact that the check valve 73 closes automatically to retain the foreign matter in the strainer barrel 60. Thus, all, or substantially all of the foreign matter intercepted by the strainer 65 is carried to the surface and may be removed readily by removing the strainer from the strainer barrel. As will be noted, the packing element 69 carried by the cylindrical strainer acts as a swab to clean the interior of the strainer barrel as the strainer is removed from the barrel, which is another feature.

As soon as the strainer 65 has been cleaned and reinstalled, the pump 39 and strainer device 40 may be run into the well again and the pump operated. If sufficient foreign matter remains in the well to plug the strainer 65 again, the pump and strainer device may be removed from the well again in the foregoing manner and the strainer 65 cleaned. This operation may be repeated as often as is required to remove all the foreign matter from the well. It will be noted that since the check valve 73 insures that all of the foreign matter entering the strainer device 40 will be retained therein during the operation of removing the pump 39, all of the foreign matter may be removed from the well by removing the pump a relatively few times as compared to the number of times required with prior devices, which is another feature.

Since the time required to run the free pump 39 and strainer device 40 into and out of the well is relatively small, it will be apparent that the fluid level in the well will not change greatly during the time required to remove and rerun the unit. Thus, when operation of the pump is resumed after it is rerun, the foreign matter, which, as previousy discussed, usually tends to float on the surface of the body of oil, almost immediately begins to enter the strainer device 40. Consequently, since the fluid level does not change appreciably, the foreign matter can all be removed from the well in a relatively short period of time. On the other hand, if the strainer device 40 is employed with a set pump, whether fluid operated, rod operated, or otherwise operated, the time required to pull and re-install the pump is of considerable magnitude so that the fluid level in the well may change appreciably. Consequently, when the strainer device 40 is used with a set pump, it is necessary to keep pulling equipment on hand for a long period of time, which is expensive. Thus, it will be seen that it is particularly advantageous to employ the present invention in connection with a free pump, which requires no pulling equipment and which may be removed and rerun in such a short period of time that the fluid level does not change substantially so that the period of time required to eliminate all of the foreign matter is relatively small. However, it will be understood that the invention may be employed advantageously in connection with set pumps in many instances and such use does not depart from the spirit of the invention.

Although I have disclosed an exemplary embodiment of the invention herein for purposes of illustration, it will be apparent that various changes, modifications and substitutions may be incorporated therein without departing from the spirit of the invention and I hereby reserve the right to all such changes, modifications and substitutions.

I claim as my invention:

1. In a well pumping apparatus, the combination of: a well pump having an inlet for a fluid to be pumped; a chamber connected to the lower end of said pump so as to be removable from the well therewith and defining an inlet passage which communicates at one end with said inlet and which conveys the fluid to be pumped to said inlet; strainer means in said chamber and traversing said inlet passage intermediate the ends thereof; and means intermediate said strainer means and the other end of said inlet passage for preventing flow through said inlet passage from said one end thereof to the other end thereof so as to retain in said chamber any foreign matter intercepted by said strainer means during flow through said inlet passage from said other end thereof to said one end thereof.

2. In a well pumping apparatus, the combination of: a well pump having an inlet for a fluid to be pumped; a chamber connected to the lower end of said pump so as to be removable from the well therewith and defining an inlet passage which communicates at one end with said inlet and which conveys the fluid to be pumped to said inlet; strainer means in said chamber and traversing said inlet passage intermediate the ends thereof; and a check valve in said inlet passage intermediate said strainer means and the other end of said inlet passage, said check valve opening to permit flow through said inlet passage from said other end thereof to said one end thereof, but closing to prevent reversed flow so as to retain in said chamber any foreign matter intercepted by said strainer means during flow through said inlet passage from said other end thereof to said one end thereof.

3. In a well pumping apparatus, the combination of: a well pump having an inlet for a fluid to be pumped; walls connected to said pump so as to be removable from the well therewith and defining an inlet passage which communicates at one end with said inlet and which conveys the fluid to be pumped to said inlet; strainer means carried by said walls and traversing said inlet passage intermediate the ends thereof; and a check valve in said inlet passage intermediate said strainer means and the other end of said inlet passage, said check valve opening to permit flow through said inlet passage from said other end thereof to said one end thereof, but closing to prevent reversed flow so as to retain in said inlet passage any foreign matter intercepted by said strainer means during flow through said inlet passage from said other end thereof to said one end thereof.

4. In a fluid-operated well pumping apparatus, the combination of: a fluid-operated well pump having an inlet for a fluid to be pumped; a chamber connected to the lower end of said pump so as to be removable from the well therewith and defining an inlet passage which communicates at one end with said inlet and which conveys the fluid to be pumped to said inlet; strainer means in said chamber and traversing said inlet passage intermediate the ends thereof; and a check valve in said inlet passage intermediate said strainer means and the other end of said inlet passage, said check valve opening to permit flow through said inlet passage from said other end thereof to said one end thereof, but closing to prevent reversed flow so as to retain in said chamber any foreign matter intercepted by said strainer means during flow through said inlet passage from said other end thereof to said one end thereof.

5. In a fluid-operated well pumping apparatus, the combination of: a fluid-operated well pump having an inlet for a fluid to be pumped; a chamber connected to the lower end of said pump so as to be removable from the well therewith and defining an inlet passage which communicates at one end with said inlet and which conveys the fluid to be pumped to said inlet; strainer means in said chamber and traversing said inlet passage intermediate the ends thereof; and a check valve in said inlet passage intermediate said strainer means and the other end of said inlet passage, said check valve opening to permit flow through said inlet passage from said other end thereof to said one end thereof, but closing to prevent reversed flow so as to retain in said chamber any foreign matter intercepted by said strainer means during flow through said inlet passage from said other end thereof to said one end thereof.

6. A well pumping apparatus according to claim 3 wherein said walls provide in said inlet passage intermediate said strainer means and said check valve a chamber of substantial size for the reception of foreign matter intercepted by said strainer means.

7. A well pumping apparatus as defined in claim 3 wherein said strainer means includes a cylindrical strainer and wherein said walls include a strainer barrel encompassing said strainer and spaced outwardly therefrom to provide an annular chamber of substantial size for the reception of foreign matter intercepted by said strainer.

8. In a fluid-operated well pumping apparatus, the combination of: a pair of tubings set in a well and connected in fluid communication adjacent their lower ends; a seat in one of said tubings adjacent the lower end thereof; a fluid-operated pump movable downwardly through said one tubing into an operating position adjacent the lower end thereof and movable upwardly through said one tubing by fluid pressure communicated thereto through the other of said tubings, said pump being provided with an inlet; and a strainer device connected to the lower end of said pump and adapted to engage said seat when said pump is in said operating position, said strainer device having an inlet passage which communicates at one end with said inlet and which is adapted to communicate at its other end with the well when said pump is in its operating position, said strainer device including strainer means traversing said inlet passage intermediate the ends thereof, and including means for preventing flow through said inlet passage from said one end thereof to the other end thereof so as to retain in said inlet passage any foreign matter intercepted by said strainer means during flow through said inlet passage from said one end thereof.

9. A strainer device, comprising: a strainer barrel chamber having an inlet at one end and an outlet at its other end; check valve means associated with said inlet and permitting flow therethrough into said barrel chamber, but preventing reversed flow; a cylindrical strainer in said barrel and closed at one end; and sealing means engaging the interior wall of said barrel for sealing the other end of said strainer relative to said barrel, said sealing means being carried by said strainer so that it swabs out said barrel on removal of said strainer from said barrel.

10. In a well pumping apparatus, the combination of: a well pump; inlet passage means connected to said pump so as to be removable from the well therewith and adapted to convey well fluid to be pumped to said pump; means in said inlet passage means for intercepting foreign matter carried into said inlet passage means by well fluid flowing therethrough to said pump; and means for preventing flow through said inlet passage means in a direction away from said pump so as to retain in said inlet passage means any intercepted foreign matter.

11. In a strainer device, the combination of: a strainer barrel having an inlet at one end and an outlet at its other end; check valve means in said inlet and opening inwardly into said barrel; a cylindrical strainer in said barrel and closed at its lower end; and a sealing ring mounted on the upper end of said strainer and engageable with the interior wall of said barrel so as to swab out said barrel upon removal of said strainer from said barrel.

12. A strainer device according to claim 11 wherein said check valve means includes a valve seat connected to the lower end of said barrel and a valve element adapted to seat on said seat and movably mounted on the lower end of said strainer.

WILLARD F. SLATER.

References Cited in the file of this patent

UNITED STATES PATENTS

| Number | Name | Date |
| --- | --- | --- |
| 1,578,720 | Derby | Mar. 30, 1926 |
| 2,014,562 | Foggan | Sept. 17, 1935 |
| 2,017,350 | Morgan | Oct. 15, 1935 |
| 2,134,413 | Munoz | Oct. 25, 1938 |
| 2,191,093 | Coberly | Feb. 20, 1940 |
| 2,213,807 | Starbuck | Sept. 3, 1940 |
| 2,230,830 | Coberly | Feb. 4, 1941 |
| 2,253,780 | Gurley | Aug. 26, 1941 |
| 2,273,349 | Farley et al. | Feb. 17, 1942 |

FOREIGN PATENTS

| Number | Country | Date |
| --- | --- | --- |
| 239,784 | Great Britain | Sept. 17, 1925 |